United States Patent
Idicula et al.

(10) Patent No.: US 7,543,004 B2
(45) Date of Patent: Jun. 2, 2009

(54) EFFICIENT SUPPORT FOR WORKSPACE-LOCAL QUERIES IN A REPOSITORY THAT SUPPORTS FILE VERSIONING

(75) Inventors: Sam Idicula, San Jose, CA (US);
Thomas Baby, Foster City, CA (US);
Vikram Kapoor, Cupertino, CA (US);
Nipun Agarwal, Santa Clara, CA (US);
Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 274 days.

(21) Appl. No.: 11/316,803

(22) Filed: Dec. 22, 2005

(65) Prior Publication Data

US 2007/0150525 A1 Jun. 28, 2007

(51) Int. Cl.
*G06F 17/30* (2006.01)
(52) U.S. Cl. .................................................... 707/203
(58) Field of Classification Search ....................... 707/2
See application file for complete search history.

(56) References Cited

U.S. PATENT DOCUMENTS

| | | | |
|---|---|---|---|
| 4,439,837 A | 3/1984 | Aiena et al. | |
| 4,536,873 A | 8/1985 | Leete | |
| 5,088,032 A | 2/1992 | Bosack | |
| 5,313,646 A * | 5/1994 | Hendricks et al. | 707/101 |
| 5,678,040 A * | 10/1997 | Vasudevan et al. | 707/8 |
| 5,706,510 A * | 1/1998 | Burgoon | 707/203 |
| 5,734,899 A | 3/1998 | Yoshizawa et al. | |
| 6,085,188 A | 7/2000 | Bachmann et al. | |
| 6,279,007 B1 | 8/2001 | Uppala | |
| 6,427,123 B1 * | 7/2002 | Sedlar | 702/2 |
| 6,460,052 B1 | 10/2002 | Thomas et al. | |
| 6,487,552 B1 | 11/2002 | Lei et al. | |
| 6,578,037 B1 | 6/2003 | Wong et al. | |
| 6,587,854 B1 * | 7/2003 | Guthrie et al. | 707/9 |

(Continued)

OTHER PUBLICATIONS

Geoff Lee, "Oracle Database 10g Release 2 XML DB Technical Overview" An Oracle White Paper, May 2005, 28 pages, Oracle Corporation, Redwood Shores, California.

(Continued)

*Primary Examiner*—Mohammad Ali
*Assistant Examiner*—Syed H Hasan
(74) *Attorney, Agent, or Firm*—Hickman Palermo Truong & Becker LLP

(57) ABSTRACT

Evaluation of workspace-local queries on a repository that supports versioning is enabled by tracking which versions of resources that are stored in the repository are associated with particular workspaces. A mapping is created and maintained for each workspace and each workspace-enabled table, i.e., a repository table that supports multiple versions of resources in the table. The mapping, such as a bit vector, is indexed by resource identifier. A set bit indicates that a particular resource version that corresponds to the bit is associated with the particular workspace. Therefore, the mapping indicates which rows in the workspace-enabled table are in the particular workspace. Index-based and functional evaluation schemes may utilize the per workspace, per table mapping to evaluate queries on the versioned repository. A new operator (IN_WORKSPACE) is introduced, through which an evaluation routine is invoked to determine whether or not a particular row maps to a particular workspace.

40 Claims, 4 Drawing Sheets

U.S. PATENT DOCUMENTS

| | | | |
|---|---|---|---|
| 6,606,627 | B1 | 8/2003 | Guthrie et al. |
| 6,631,386 | B1 | 10/2003 | Arun et al. |
| 6,785,769 | B1* | 8/2004 | Jacobs et al. ............... 711/118 |
| 6,959,416 | B2 | 10/2005 | Manning et al. |
| 7,117,216 | B2 | 10/2006 | Chakraborty et al. |
| 7,139,746 | B2 | 11/2006 | Shin et al. |
| 7,287,033 | B2 | 10/2007 | Shadmon et al. |
| 2002/0143906 | A1 | 10/2002 | Tormasov et al. |
| 2002/0147634 | A1 | 10/2002 | Jacoby et al. |
| 2004/0088306 | A1* | 5/2004 | Murthy et al. ............. 707/100 |
| 2004/0205082 | A1 | 10/2004 | Fontoura et al. |
| 2004/0220912 | A1* | 11/2004 | Manikutty et al. ............ 707/3 |
| 2005/0091188 | A1 | 4/2005 | Pal et al. |
| 2005/0097084 | A1 | 5/2005 | Balmin et al. |
| 2005/0144198 | A1 | 6/2005 | Bergstraesser et al. |
| 2006/0271606 | A1 | 11/2006 | Tewksbary |
| 2006/0288056 | A1 | 12/2006 | Yamakawa et al. |
| 2007/0043715 | A1 | 2/2007 | Kaushik et al. |
| 2007/0118561 | A1 | 5/2007 | Idicula et al. |

OTHER PUBLICATIONS

Mark Drake, "Oracle Database 10g Release 2 XML DB" An Oracle Technical White Paper, May 2005, 97 pages, Oracle Corporation, Redwood Shores, California.

Mark D. Drake, "Oracle Database 10g Release 2 XML DB & XML DB Repository" Oracle Data Sheet, May 2005, 6 pages, Oracle Corporation, Redwood Shores, California.

"Managing Content with Oracle XML DB", An Oracle White Paper, Mar. 2005, 38 pages, Redwood Shores, California.

Geoff Lee et al., "Mastering XML DB Storage in Oracle Database 10g Release 2" An Oracle White Paper, Mar. 2005, 15 pages, Oracle Corporation, Redwood Shores, California.

Geoff Lee, "Mastering XML DB Repository in Oracle Database 10g Release 2" An Oracle White Paper, Mar. 2005, 15 pages, Redwood Shores, California.

Sean Dillon, "Getting to XML", Oracle Magazine, May/Jun. 2005, 3 pages.

Oracle XML DB Developer's Guide 10g Release 2 (10.2) B14259-02, Aug. 2005, 24 pages.

"Oracle 9i Database Daily Feature", Oracle Technology Network, Jun. 2005, 3 pages.

Bill Beauregard, "Oracle Database 10g Workspace Manager Support for Oracle Spatial Topology Data Model" An Oracle White Paper, May 2005, 7 pages.

Bill Beauregard, "Oracle Database 10g Workspace Manager Overview" An Oracle White Paper, May 2005, 13 pages, Redwood Shores, California.

Bill Beauregard, "Using Oracle Workspace Manager to Cut Costs: Case Studies", Dec. 2003, 36 pages.

"IETF WebDAV Working Group World Wide Web Distributed Authoring and Versioning" retrieved on Feb. 22, 2006 from the Internet < URL: http:/ftp.ics.uci.edu/pub/ietf/webdav/ > 6 pages.

"Versioning Extensions to WebDAV (Web Distributed Authoring and Versioning)" retrieved on Feb. 22, 2006 from the Internet < URL: http://www.webdav.org/deltav/protocol/rfc3253.html > (110 pages).

"Versioning Extensions to WebDAV (Web Distributed Authoring and Versioning)" retrieved on Feb. 27, 2006 from the Internet < URL: http://www.webdav.org/deltav/protocol/rfc3253.html > (112 pages).

"*WVCM: The Workspace Versioning and Configuration Management API*" retrieved on Feb. 27, 2006 from the Internet < URL: http://www.webdav.org/deltav/wvcm/wvcm-overview.html > (16 pages).

Chou, H. et al., "A Unifying Framework for Version Control in a CAD Environment" Aug. 1986 (pp. 336-344).

* cited by examiner

EFFICIENT SUPPORT FOR WORKSPACE-LOCAL QUERIES IN A REPOSITORY THAT SUPPORTS FILE VERSIONING

FIELD OF THE INVENTION

The present invention relates generally to data management and, more specifically, to techniques supporting workspace-local queries in the context of a repository that supports file versioning.

BACKGROUND

A database may provide a file repository that can be accessed via a variety of file system-based interfaces, such as those utilizing HTTP/WebDAV (Web Distributed Authoring and Versioning) or NFS (Network File System). Through such interfaces to the repository, a file is located, for example, via its URL or path and the repository is exposed as a hierarchical set of files and folders (e.g., directories). Further, data-oriented access mechanisms can be used to access a file repository, which expose the repository as a flat set of files that can be queried based on file content or attributes.

Files can be versioned, for example, in order to keep a record of changes to files, to provide the option to revert to an older version of a file, and to get information on who made each change to a file and the progression of changes to the file. Thus, a version-controlled file is one whose versions are tracked by the repository. When several users are working collaboratively on a set of files organized in a folder hierarchy, the users need to be isolated from each other's in-progress changes. For example, user U1 may be working on a project that needs to change files f1 and f2, and user U2 may need to use these files while working on another project. However, until U1 has completed changes to f1 and f2, U2 should see only the older versions of both files. Thus, a versioned repository allows users to checkout files, possibly update the files, and check the files in once the updates are completed. In this scenario, U2 does not want to see U1's checked-out versions of files. Because each version may need to be indexed and accessed as a separate entity, one approach is to store each version in a separate row of a table, which is referred to herein as a resource table.

Traditional versioning systems provide isolation using workspaces, an abstraction used to identify and maintain separate folder hierarchies for different users so that multiple users can work in isolation on a set of resources. An extension to WebDAV, referred to as "DeltaV," is a network protocol that provides facilities for remote versioning and configuration management of documents stored on Web servers, which often interface with a file system-like repository for content management purposes. DeltaV is described in "DeltaV: Adding Versioning to the Web; WWW10 Tutorial Notes" (referred to herein as "the DeltaV reference") available from the WebDAV.org organization; the entire contents of which is incorporated by this reference for all purposes as if fully disclosed herein.

A workspace is essentially a copy of a set of resources, e.g., files, in which a user can work in isolation from other users, where users' interactions are in the form of branches in the version histories of version-controlled resources. Thus, each workspace typically contains one version-controlled resource corresponding to each version-history for a resource associated with, or "in", the workspace. The version that one workspace's version-controlled resource points to may be different from the version pointed to by a version-controlled resource of the same version-history in another workspace, thus achieving isolation. However, a given version (generally, one that does not contain in-progress changes) may be used by several workspaces.

When users perform queries in a particular workspace, the users expect only version rows that are in that particular workspace to be selected from the resource table. Thus, as referred to herein, a "workspace-local" query is a query which, when executed, selects only versions that are associated with the particular workspace in which the user is working. Workspace-local queries are especially important in the context of data-oriented repository queries, but are applicable to any data container that stores versions of resources or portions of such versions (i.e., generally, a table that stores at least a portion of the content of a version), and supports workspaces, e.g., a "workspace-enabled" database table. Supporting workspace-local queries in an efficient manner, while maintaining the required isolation among workspaces, poses certain challenges. Further, because there can be a large number of user workspaces associated with a given repository, a good approach to enabling workspace-local queries should have minimal overhead so that it can scale well.

In view of the foregoing, there is a need for efficient support for workspace-local queries in a repository that supports versioning of resources in the repository.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
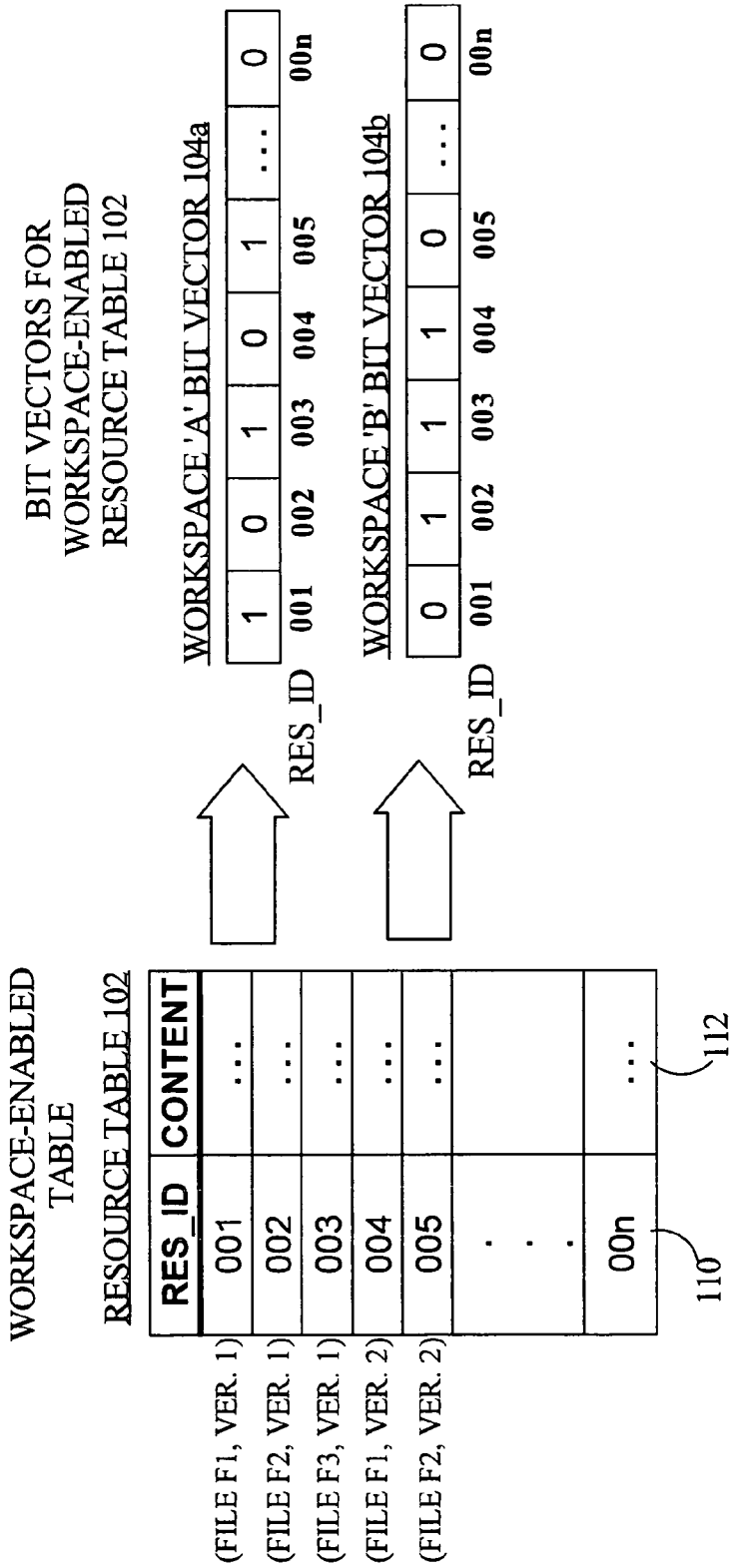
FIG. 1 is a block diagram illustrating data structures used to enable and efficiently query workspace-enabled tables, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Evaluation of workspace-local queries on a repository that supports versioning is enabled, generally, by tracking which versions of resources (e.g., a file) or portions of resources (e.g., content of an XML document) that are stored in the repository are associated with particular workspaces. However, a given version row (generally, one that does not contain in-progress changes) in a given resource table may be used by several workspaces. Hence, it is not possible to have a single-valued workspace column per row.

According to one embodiment of the invention, a mapping is created and maintained for each workspace and each workspace-enabled table, i.e., a repository table that supports multiple versions of resources or portions of resources (e.g., resource content) in the table. The mapping, such as an array of bits (i.e., a bit vector), is indexed by resource identifier. Thus, a set bit indicates that a particular resource version that corresponds to the bit is "in" or associated with the particular workspace. For example, the mapping indicates which rows in the workspace-enabled table are in the particular workspace.

Consequently, index-based and functional evaluation schemes may utilize the per workspace, per table mapping to evaluate queries on the versioned repository. Additionally, a new operator (IN_WORKSPACE) is introduced, through which an evaluation routine is invoked to determine whether or not a particular row maps to a particular workspace. Furthermore, a database query (e.g., a SQL statement) on a workspace-enabled table can be rewritten to include a predicate with the new operator and, therefore, to use the mapping and the associated routines in order to evaluate whether or not a particular row maps to a particular workspace. In an index-based evaluation, given a particular workspace and a particular workspace-enabled table, evaluation determines which rows in the particular table are associated with the particular workspace. In a functional evaluation, given a particular workspace and a particular row in a particular workspace-enabled table, evaluation determines whether or not the particular row is associated with the particular workspace.

Operating Environment-Database System

The techniques described herein may be implemented in the context of a database system and, according to one embodiment, are implemented in a database repository that supports versioning of hierarchically organized resources such as a file system-like repository. A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Such a repository is at times referred to as an XML repository or an XML database (i.e., "XDB").

Workspace-Enabled Database Table

FIG. 1 is a block diagram illustrating data structures used to enable and efficiently query workspace-enabled tables, according to an embodiment of the invention. Workspace-enabled tables are tables for which an associated per-workspace mapping is constructed. One example of a workspace-enabled table is resource table 102. Herein, references to resource tables are intended to be a general reference to any form of workspace-enabled tables, unless otherwise indicated. Resource table 102 is a data table that stores records associated with multiple workspaces and, therefore, stores all versions of all resources, or portions thereof, that are stored in the repository in association with the multiple workspaces. It is typical that, at any given time, different workspaces are associated with different versions of the same file. Thus, resource table 102 may store, at any point in time, the current versions of resources (in their entirety or portions thereof) associated with each of multiple workspaces. The schema of resource table 102 may vary from implementation to implementation, but is depicted in FIG. 1 comprising columns for resource identifiers ('res_id') 110 and the content 112 of the respective versions of the resources.

A resource table 102 may store, in content 112, resources that represent an entire file, such as in the context of a file system-like repository. For example, each record in resource table 102 stores the entire content of a corresponding file. Furthermore, resource table 102 may store, in content 112, resources that represent a portion of the content of documents stored in a repository, such as data associated with a particular element from a group of shredded XML documents. For example, each record in a resource table 102 stores the values for a corresponding respective XML element from the group of XML documents. For another example, each record in a resource table 102 stores the values for corresponding attributes from an object of a class, or stores the values for a corresponding attribute from multiple objects of a class. The manner in which resource data is stored in an implementation of a resource table 102 may vary from implementation to implementation and, therefore, the foregoing are presented as non-limiting examples.

Per Workspace, Per Table Mapping

According to one embodiment, a workspace-specific mapping is created for each resource table 102 in which resources associated with the specific workspace are stored. Each mapping is stored persistently. If a particular resource table does not contain any resources associated with a particular workspace, then a mapping is not needed for the particular workspace for the particular table. Depicted in FIG. 1 are bit vectors 104a, 104b (per workspace, per table bit vectors are generally referred to hereafter as bit vectors 104), which are associated with a workspace 'A' and a workspace 'B', respectively. Thus, in a scenario in which a single repository resource table 102 is used to store resources that represent an entire file, such as in the context of a file system-like repository, one bit vector 104 is created for each workspace that is associated with the single resource table 102. Similarly, in a scenario in which each of multiple resource tables 102 is used to store resources that represent a portion of the content of documents stored in a repository, such as data associated with a particular XML element from a group of shredded XML documents, one bit vector 104 is created for each workspace that is associated with each of the multiple resource tables 102.

Each bit vector 104, with each bit position corresponding to a row in a corresponding resource table 102, is maintained in or associated with a respective workspace. According to one embodiment, bit vectors 104 provide an indication, based on resource version identifiers ('res_id') 110, of which resources and which versions of resources contained in a corresponding resource table 102 are in the workspace to which each respective bit vector 104 corresponds. For example, if the bit value is 1, the resource (e.g., in resource table 102) corresponding to the bit location in bit vector 104 is present in the corresponding workspace. Similarly, if the bit value is 0, the resource corresponding to the bit location in bit vector 104 is not present in the corresponding workspace. Thus, a particular bit in a bit vector 104 functions to identify and provide location information for locating in the resource table 102 (e.g., locating on persistent storage) the versions of resources that are in the workspace to which the bit vector 104 corresponds. This is because the bits in bit vector 104 are indexed by the resource identifiers ('res_id'), which refer back to the resource identifiers in respective rows of resource table 102, which identify, store or otherwise refer to the location in memory of the actual content of the resource version.

For an example in reference to the resource table 102 and bit vector 104a of FIG. 1, workspace 'A' is shown having bits set for bits corresponding to res_ids 001, 003 and 005. These res_ids correspond to the rows, in the corresponding resource table 102, for file F1, version 1; file F3, version 1; and file F2, version 2. Hence, those version of those files are considered as being in the workspace 'A'. Similarly, in reference to the resource table 102 and bit vector 104b of FIG. 1, workspace 'B' is shown having bits set for bits corresponding to res_ids 002, 003 and 004. These res_ids correspond to the rows, in the corresponding resource table 102, for file F2, version 1; file F3, version 1; and file F1, version 2 and, therefore, those version of those files are considered as being in the workspace 'B'.

The bit vectors 104 are maintained by tracking all version changes in a workspace. When a user checks out a row or updates the version of a version-controlled file, the old bit is reset and the new bit is set. When a workspace is initialized using another workspace, the other workspace's bit vectors 104 are copied to the new workspace. These bit vectors can be highly compressed and, therefore, have minimal storage overhead, thus scaling to a large number of workspaces.

For actual storage purposes, the bit vector 104 may be broken into sections, where the res_id range corresponding to each section is also maintained. Bit vector 104 is depicted in FIG. 1 as comprising a range of res_ids from 001-00n, for convenience. However, the range of res_ids associated with a given bit vector 104 may vary from implementation to implementation. For example, if for a particular resource table 102, the range of res_ids for a particular workspace is known and relatively constant, then the corresponding bit vector 104 for that table and that workspace can be constructed to comprise a range of bits that does not start at the first res_id. Hence, a bit vector 104 may be stored with an associated res_id range that identifies the range of res_ids that corresponds to that bit vector, or identifies the res_id corresponding to the first bit location in the bit vector.

It is possible to cache an entire per workspace, per table bit vector 104 (or frequently accessed parts of the bit vector 104) in the session in order to provide a fast and efficient evaluation of a workspace-local query.

Responding to a Workspace-Local Query on the Repository

As mentioned, when users perform workspace-local queries on one or more resource containers that contain multiple versions of resources, the users expect only version records that are in that particular workspace to be selected from the resource containers (e.g., resource table(s) 102 of FIG. 1). In other words, the query engine processing the query should only show to the user rows that the particular workspace is allowed to see. Hence, according to one embodiment, the bit vector 104 (FIG. 1) data construct is used to efficiently execute queries constructed directly on database tables (e.g., rather than queries submitted via a file-system API). One form of queries that typically access tables directly are data-oriented access queries, such as SQL access queries.

One approach to execution of workspace-local queries is to create a column in the resource table 102 (FIG. 1) to store values that indicate with which workspaces the corresponding row is associated. However, because each row in the resource table 102 does not necessarily map to only a single workspace, a multiple-value column would be needed. Such a column is not easy to index and, therefore, not easy to scan or search. This is primarily because searching on such a multi-value column, storing an array of values, for each row would need to resolve into the array to determine whether or not the row is associated with the given workspace. Additionally, if the resource table 102 stored resources associated with many different workspaces, the performance involved with use of this table would significantly deteriorate relative to the number of associated workspaces. Therefore, this approach is not a preferred approach. A better approach is the foregoing per table, per workspace bit vector 104 (FIG. 1) approach.

Index-Based Evaluation

Figure 2:
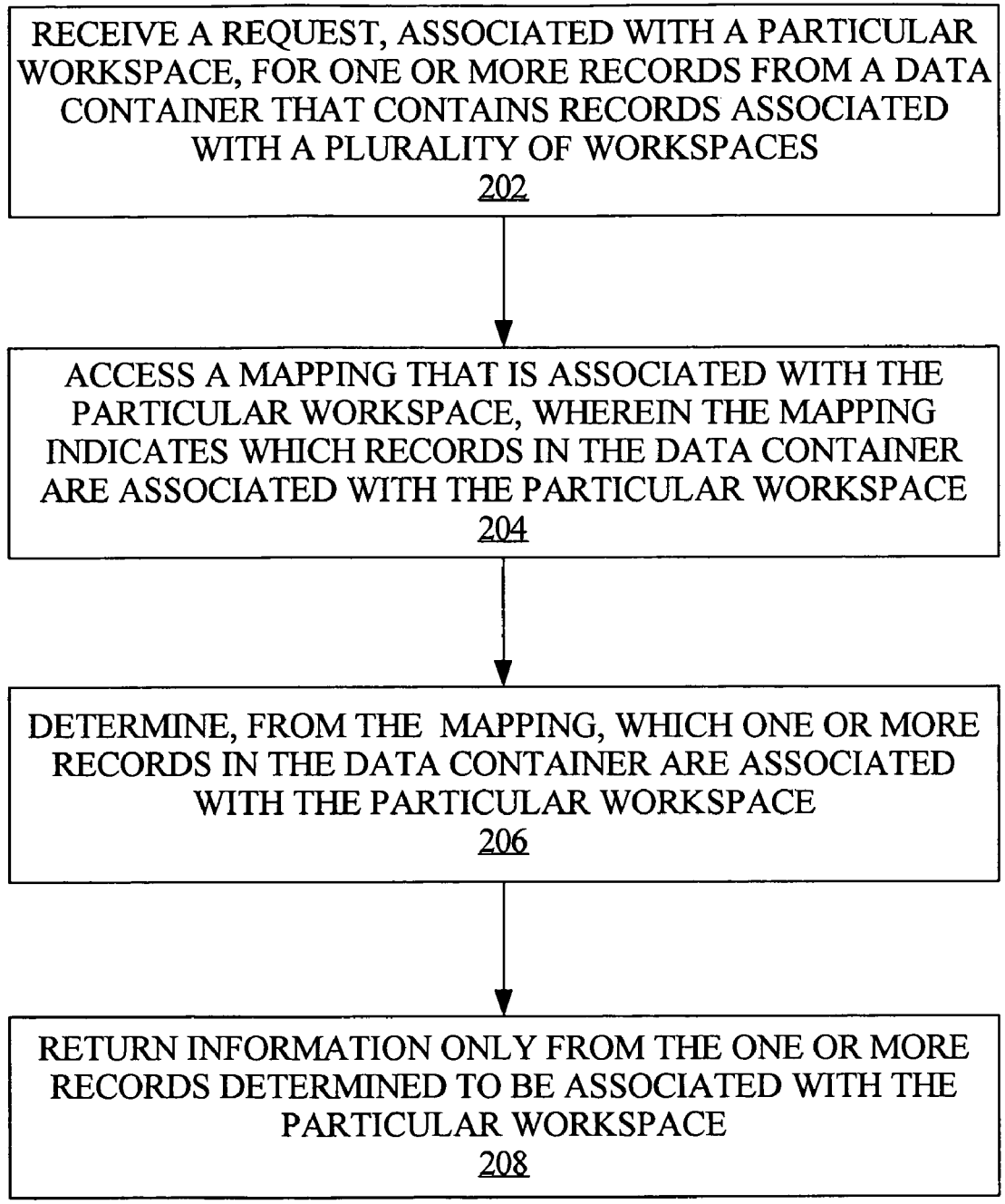
FIG. 2 is a flow diagram that illustrates a process for processing a workspace-local query on a repository that supports versioning of resources, according to an embodiment of the invention.

FIG. 2 is a flow diagram that illustrates a process for processing a workspace-local query on a repository that supports versioning of resources, according to an embodiment of the invention. The process illustrated in FIG. 2 is implemented for automated performance by a conventional computing system, such as computer system 400 of FIG. 4. One possible operating environment in which the process of FIG. 2 may be implemented is a database system. The process of FIG. 2 embodies an index-based approach to evaluating a workspace-local query, utilizing a mapping such as bit vector 104.

At block 202, a request is received for one or more records from a data container that contains records associated with a plurality of workspaces. The request is associated with a particular workspace. A simple non-limiting example of such a request is a database statement according to the SQL language, as follows:

```
select *
from res_tbl
where wsid=<workspace A>.
```

The foregoing query requests all records from a database table 'RES_TBL' (e.g., resource table 102 of FIG. 1) that are associated with a particular workspace. The particular workspace of interest, denoted here as 'workspace A', is specified in the WHERE clause, where WSID refers to a workspace identifier variable. Those skilled in the art will realize that the workspace identifier variable name and the format for the workspace identifier may vary from implementation to implementation. Furthermore, if the user's current workspace is not explicitly specified in the request, the database server is able to determine the user's current workspace based on database session parameters, as described in greater detail herein.

At block 204, a mapping is accessed, which is associated with the particular workspace and the particular data container. The mapping indicates which records in the data container are associated with the particular workspace. Continuing with the foregoing example query, based on the table and workspace specified in the query, the appropriate mapping is accessed, such as a bit vector 104a (FIG. 1) corresponding to table 'RES_TBL' and 'workspace A'. In order to access the appropriate mapping, the database server (e.g., the query engine) can make a call to another layer of the database server, such as the XDB layer.

At block 206, it is determined from the mapping which one or more records in the data container are associated with the particular workspace. For example, bit vector 104a is read to determine that 'workspace A' is associated with res_ids 001, 003, and 005. As previously described, these res_ids correspond to particular rows in the corresponding resource table 102 (based on the res_id column 110), for file F1, version 1; file F3, version 1; and file F2, version 2. Hence, those version of those files are determined to be associated with, or in, the 'workspace A'.

Hence, at block 208, in response to the request, information is returned only from the one or more records determined at block 206 to be associated with the particular workspace. For example, only content 112 (FIG. 1) from the rows for file F1, version 1; file F2, version 2; and file F3, version 1; is returned. Thus, no information is returned from the rows for file F1, version 2 or file F2, version 1. Hence, a workspace-local query is efficiently and accurately evaluated according to an index-based evaluation approach, by identifying and using the appropriate workspace-resource mapping, such as bit vector 104.

Functional Evaluation

Figure 3:
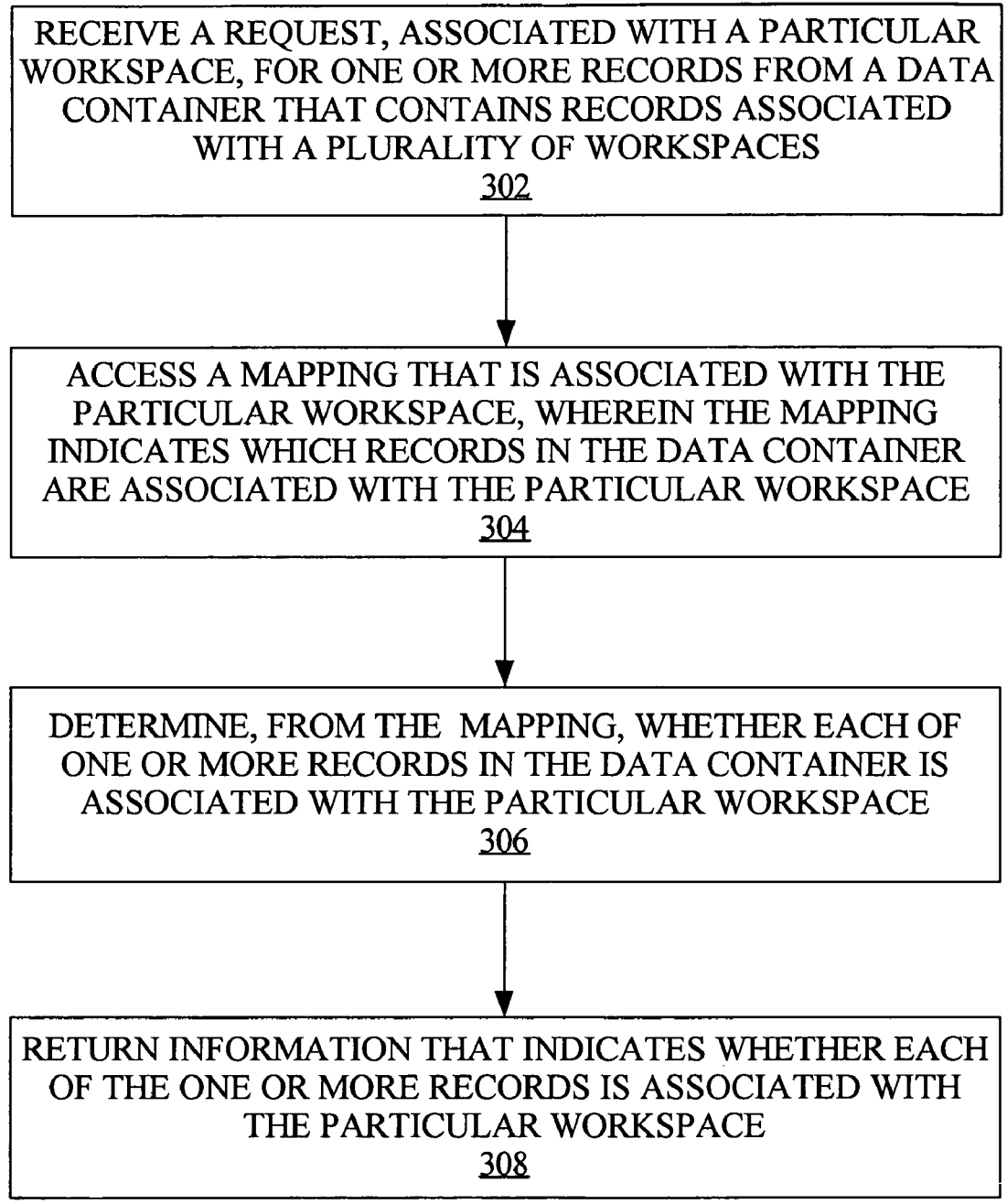
FIG. 3 is a flow diagram that illustrates a process for processing a workspace-local query on a repository that supports versioning of resources, according to an embodiment of the invention.

FIG. 3 is a flow diagram that illustrates a process for processing a workspace-local query on a repository that supports versioning of resources, according to an embodiment of the invention. The process illustrated in FIG. 3 is implemented for automated performance by a conventional computing system, such as computer system 400 of FIG. 4. One possible operating environment in which the process of FIG. 3 may be implemented is a database system. The process of FIG. 3 embodies a finctional approach to evaluating a workspace-local query, utilizing a mapping such as bit vector 104.

Blocks 302 and 304 are similar to blocks 202 and 204 (FIG. 2), in that a request is received for records (i.e., data) from a workspace-enabled data container (e.g., a database table) that contains records for multiple workpaces, and a mapping (e.g., bit vector 104 of FIG. 1) is accessed that corresponds to the workspace specified in the request. In order to access the appropriate mapping, the database server (e.g., the query engine) can make a call to another layer of the database server, such as the XDB layer, for each record scanned from the resource table 102 (FIG. 1). As described in reference to FIG. 2, an index-based evaluation involves, given a workspace, determine and return the resources (e.g., records) that are associated with the workspace. By contrast, a finctional evaluation differs in that, given a resource, determine and indicate whether or not the resource is in the workspace.

Hence, at block 306, it is determined from the mapping whether each of one or more records in the data container is associated with the particular workspace. For example, given a resource identifier res_id=001, determine from bit vector 104a that the resource identified by res_id 001 is in 'workspace A'. As previously described, this res_id corresponds to a particular row in the corresponding resource table 102 (based on the res_id column 110), for file F1, version 1. Likewise, given resource identifiers for other versions of other files stored in resource table 102, it can be determined whether or not each version is associated with 'workspace A'.

At block 308, in response to the request, information is returned that indicates whether each of the one or more records is associated with the particular workspace, as determined at block 306. Indicating that a record is associated with the particular workspace can be implemented by simply returning information from the record. For example, only content 112 (FIG. 1) from the rows for file F1, version 1; file F2, version 2; and file F3, version 1; is returned for the request associated with 'workspace A', and no information is returned from the rows for file F1, version 2 or file F2, version 1. Thus, feeding a functional evaluation with every res_id from a resource table, and repeatedly performing the functional evaluation on the res_ids, can return the same results as an index-based evaluation. Hence, a workspace-local query is efficiently and accurately evaluated according to a functional evaluation approach, by identifying and using the appropriate workspace-resource mapping, such as bit vector 104.

In_Workspace Operator

A new query language operator, IN_WORKSPACE, is introduced into the database system to provide a mechanism for the main database server to invoke routines to perform operations involved with index-based evaluation and functional evaluation of workspace-local queries using the per table, per workspace mapping, as described herein. In other words, the operator is used to command the main database server query execution layer to call another layer, such as the XDB layer described herein. Hence, this operator can be included in a database statement for querying a workspace-enabled table in a repository that supports versioning.

According to one embodiment, upon recognizing that execution of a database statement would access a workspace-enabled table (e.g., during semantic analysis of the statement by the main database server query engine), a call is made to a layer of the database server (e.g., the XDB described herein) for rewriting the original database statement to include a predicate with the IN_WORKSPACE operator. For example,

```
    select *
        from res_tbl,
    can be rewritten as
    select *
        from res_tbl t
        where in_workspace (t.rowid, <current_workspace_identifier>).
```

Each database session is associated with a particular user after a corresponding login and authentication process. Hence, based on from which session the database statement was submitted, the database server can determine what user is associated with the session and, therefore, what user submitted the query statement. Furthermore, each session is associated with a particular workspace, either automatically with a default workspace for the user when the session is initiated, or by an explicit user invocation of an API to set the workspace in the current session to override the default workspace for the user. Hence, if not explicitly stated in the database statement, all the necessary information is available to the database server to determine from what workspace the user submitted the database statement. As part of the foregoing query rewrite process, the current workspace of the user that submitted the query is determined, and this workspace is specified as an argument to the IN_WORKSPACE operator.

The rewritten query can then be sent to the database server query engine, where it may be evaluated (e.g., based on execution costs) to choose an appropriate query execution plan, i.e., a plan involving the index-based evaluation or the functional evaluation. The query engine can then either use the bit vector 104 (FIG. 1) to perform an index-based evaluation, or make calls into the XDB layer for each scanned row from the resource table 102 (FIG. 1) for performing the functional evaluation on that row.

Hardware Overview

Figure 4:
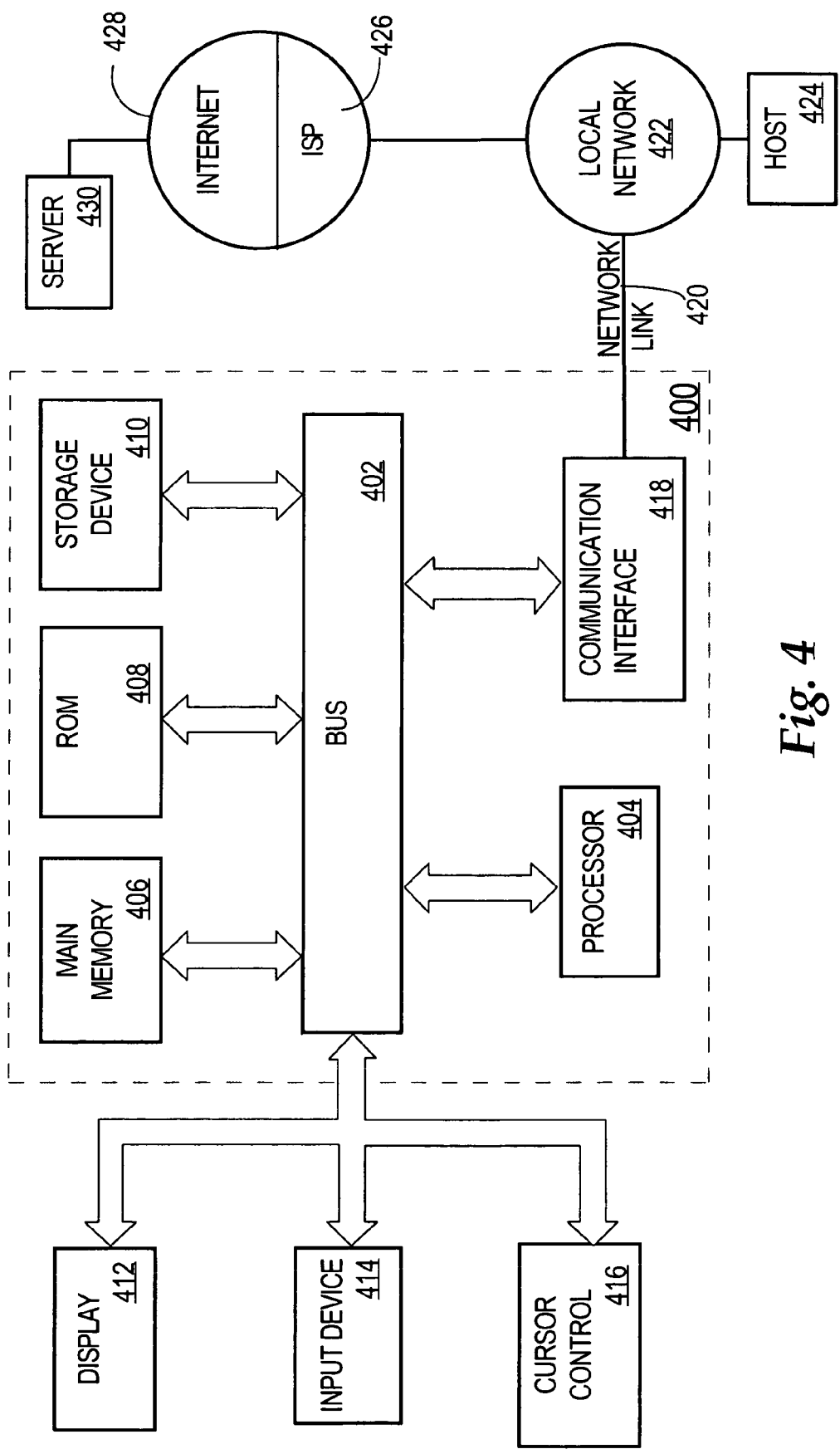
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, implemented on a processor, comprising the steps of:
maintaining, separate from a database table, a plurality of mappings;
wherein the database table contains a plurality of records;
wherein each mapping of the plurality of mappings corresponds to a different workspace of a plurality of workspaces;
wherein each mapping of the plurality of mappings explicitly indicates which records, within the database table, are associated with the workspace to which said each mapping corresponds;
receiving a first request, associated with a first workspace, for one or more records from the database table;
in response to receiving the first request:
accessing, from the plurality of mappings, a first mapping that is associated with the first workspace;
determining, from the first mapping, which records in the database table are associated with the first workspace; and
returning first information only from the records determined to be associated with the first workspace;
receiving a second request, associated with a second workspace that is a different workspace from the first workspace, for one or more records from the database table;
in response to receiving the second request:
accessing, from the plurality of mappings, a second mapping that is associated with the second workspace and that is a different mapping from the first mapping;
determining, from the second mapping, which records in the database table are associated with the second workspace;
and returning second information only from the records determined to be associated with the second workspace;
wherein at least one of the records determined to be associated with the first workspace is the same record as a record determined to be associated with the second workspace.

2. The method of claim 1, wherein the step of receiving a request includes receiving a request that identifies the first workspace.

3. The method of claim 2, wherein the step of receiving a first request includes receiving a first request that identifies a particular database table, and wherein the step of accessing a first mapping includes accessing a first mapping that is associated with the particular database table.

4. A machine-readable storage medium storing instructions which, when executed by one or more processors, cause the one or more processors to perform the steps of claim 3.

5. A machine-readable storage medium storing instructions which, when executed by one or more processors, cause the one or more processors to perform the steps of claim 2.

6. The method of claim 1, wherein the first mapping is a bit vector in which each bit corresponds to a record identifier that identifies a particular row in the database table.

7. A machine-readable storage medium storing instructions which, when executed by one or more processors, cause the one or more processors to perform the steps of claim 6.

8. The method of claim 1, wherein the step of returning first information includes returning a respective memory location at which each of the records, determined to be associated with the first workspace, are persistently stored.

9. A machine-readable storage medium storing instructions which, when executed by one or more processors, cause the one or more processors to perform the steps of claim 8.

10. The method of claim 1, wherein the step of returning first information includes returning respective content of each of the records determined to be associated with the first workspace.

11. A machine-readable storage medium storing instructions which, when executed by one or more processors, cause the one or more processors to perform the steps of claim 10.

12. The method of claim 1, wherein the database table contains records corresponding to respective versions of resources stored in a repository that supports versioning.

13. A machine-readable storage medium storing instructions which, when executed by one or more processors, cause the one or more processors to perform the steps of claim 12.

14. The method of claim 1, wherein the database table contains records coffesponding to respective content of XML elements from one or more XML documents.

15. A machine-readable storage medium storing instructions which, when executed by one or more processors, cause the one or more processors to perform the steps of claim 14.

16. The method of claim 1, further comprising the steps of:
  determining from the first request that the database table identified in the first request contains records associated with the plurality of workspaces; and
  rewriting the query to include a particular operator through which a routine is invoked, wherein execution of the routine causes the steps of accessing and determining to be performed.

17. A machine-readable storage medium storing instructions which, when executed by one or more processors, cause the one or more processors to perform the steps of claim 16.

18. The method of claim 1, wherein the step of receiving a first request includes receiving a SQL statement that includes the first request.

19. A machine-readable storage medium storing instructions which, when executed by one or more processors, cause the one or more processors to perform the steps of claim 18.

20. The method of claim 1, wherein at least one of the records determined to be associated with the first workspace is not a record determined to be associated with the second workspace.

21. A machine-readable storage medium storing instructions which, when executed by one or more processors, cause the one or more processors to perform the steps of claim 20.

22. A machine-readable storage medium storing instructions which, when executed by one or more processors, cause the one or more processors to perform the steps of claim 1.

23. A method, implemented on a processor, comprising the steps of:
  maintaining, separate from a database table, a plurality of mappings;
  wherein the database table contains a plurality of records;
  wherein each mapping of the plurality of mappings corresponds to a different workspace of a plurality of workspaces;
  wherein each mapping of the plurality of mappings explicitly indicates which records, within the database table, are associated with the workspace to which said each mapping corresponds;
  receiving a first request, associated with a first workspace, for one or more records from the database table;
  in response to receiving the first request:
  accessing, from the plurality of mappings, a first mapping that is associated with the first workspace;
  determining, from the first mapping, whether each of one or more records in the database table is associated with the first workspace; and
  returning first information that indicates whether each of the one or more records is associated with the first workspace;
  receiving a second request, associated with a second workspace that is a different workspace from the first workspace, for one or more records from the database table;
  in response to receiving the second request:
    accessing a second mapping that is associated with the second workspace and that is a different mapping from the first mapping, wherein the second mapping indicates which records in the database table are associated with the second workspace;
    determining, from the second mapping, whether each of the one or more records in the database table is associated with the second workspace; and
    returning second information that indicates whether each of the one or more records in the database table is associated with the second workspace;
  wherein at least one of the records determined to be associated with the first workspace is the same record as a record determined to be associated with the second workspace.

24. The method of claim 23, wherein the step of receiving a first request includes receiving a first request that identifies the first workspace.

25. The method of claim 24, wherein the step of receiving a first request includes receiving a first request that identifies a particular database table, and wherein the step of accessing a first mapping includes accessing a first mapping that is associated with the particular database table.

26. A machine-readable storage medium storing instructions which, when executed by one or more processors, cause the one or more processors to perform the steps of claim 25.

27. A machine-readable storage medium storing instructions which, when executed by one or more processors, cause the one or more processors to perform the steps of claim 24.

28. The method of claim 23, wherein the first mapping is a bit vector in which each bit corresponds to a record identifier that identifies a particular row in the database table.

29. A machine-readable storage medium storing instructions which, when executed by one or more processors, cause the one or more processors to perform the steps of claim 28.

30. The method of claim 23, wherein the database table contains records corresponding to respective versions of resources stored in a repository that supports versioning.

31. A machine-readable storage medium storing instructions which, when executed by one or more processors, cause the one or more processors to perform the steps of claim 30.

32. The method of claim 23, wherein the database table contains records coffesponding to respective content of XML elements from one or more XML documents.

33. A machine-readable storage medium storing instructions which, when executed by one or more processors, cause the one or more processors to perform the steps of claim 32.

34. The method of claim 23, further comprising the steps of:
  determining from the first request that the database table identified in the first request contains records associated with the plurality of workspaces; and
  rewriting the query to include a particular operator through which a routine is invoked, wherein execution of the routine causes the steps of accessing and determining to be performed.

35. A machine-readable storage medium storing instructions which, when executed by one or more processors, cause the one or more processors to perform the steps of claim 34.

36. The method of claim 23, wherein the step of receiving a first request includes receiving a SQL statement that includes the first request.

37. A machine-readable storage medium storing instructions which, when executed by one or more processors, cause the one or more processors to perform the steps of claim 36.

38. The method of claim 23, wherein at least one of the records determined to be associated with the first workspace is not a record determined to be associated with the second workspace.

39. A machine-readable storage medium storing instructions which, when executed by one or more processors, cause the one or more processors to perform the steps of claim 38.

40. A machine-readable storage medium storing instructions which, when executed by one or more processors, cause the one or more processors to perform the steps of claim 23.

* * * * *

UNITED STATES PATENT AND TRADEMARK OFFICE
CERTIFICATE OF CORRECTION

PATENT NO. : 7,543,004 B2　　　　　　　　　　　　　　　　　　　　　　　Page 1 of 1
APPLICATION NO. : 11/316803
DATED : June 2, 2009
INVENTOR(S) : Idicula et al.

It is certified that error appears in the above-identified patent and that said Letters Patent is hereby corrected as shown below:

In column 8, line 7, delete "finctional" and insert -- functional --, therefor.

In column 8, line 12, delete "workpaces," and insert -- workspaces, --, therefor.

In column 8, line 21, delete "finctional" and insert -- functional --, therefor.

In column 12, line 63, in claim 14, delete "coffesponding" and insert -- corresponding --, therefor.

In column 14, line 32, in claim 32, delete "coffesponding" and insert -- corresponding --, therefor.

Signed and Sealed this

First Day of June, 2010

David J. Kappos
*Director of the United States Patent and Trademark Office*